July 6, 1948.  J. L. FRANKLIN  2,444,818
ANNOUNCING MACHINE AND SYSTEM
Filed Feb. 9, 1945  7 Sheets-Sheet 1

Inventor
JOHN L. FRANKLIN
By Jewett and Inrad
Attorneys

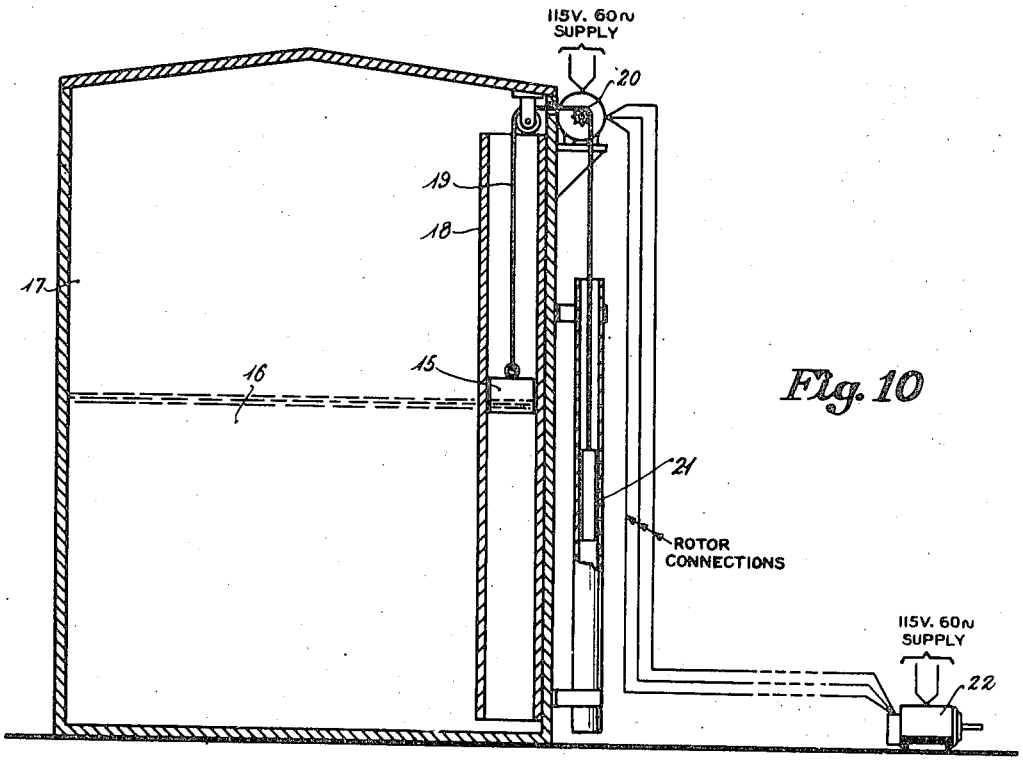
Fig. 10
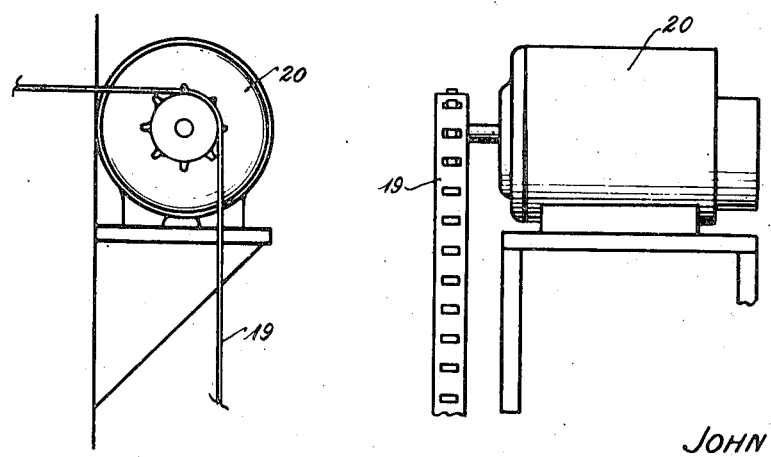
Fig. 11
Fig. 12
Inventor
JOHN L. FRANKLIN

Patented July 6, 1948

2,444,818

UNITED STATES PATENT OFFICE 2,444,818

ANNOUNCING MACHINE AND SYSTEM

John L. Franklin, Atlanta, Ga.

Application February 9, 1945, Serial No. 577,097

11 Claims. (Cl. 177—351)

The invention relates to announcing machines and has as an object the provision of a machine provided with a plurality of sound records each combinable with one or a plurality of others thereof to make up a message to supply information when the machine is operated with a single reproducer.

It is an object of the invention to provide a system of electrical circuits to control a machine of the class referred to.

It is a further object to provide an announcing machine provided with a plurality of sound records arranged in groups, in such a manner that desired records from some or all of the groups may be selected and brought each into the zone or path in which a sound reproducing means is active and to cause relative movement between the records and reproducing means whereby to successively reproduce the sounds and by their combined reproduction in succession to transmit information.

It is a further object of the invention to provide a machine comprising a plurality of groups of sound records adapted to reproduce speech including announcement of the various units and fractional parts of units of measurement of time, one, two or three dimensional space, quantity, temperature, pressure, weight or other necessary expressions to indicate quantity of material in a tank, or pipe or existing conditions of rate of flow, pressure, temperature, speed, quantity, weight, density, altitude, intensity, number, size, compass bearings, depth, thickness, hardness, viscosity, angle, power, electrical potential, current, revolutions per unit of time, time, or substantially any condition of fact which can be determined by any metering instrument.

It is a further object to provide a machine that will translate the condition of fact indicated by a meter into speech and transmit the same by telephone or loud speaker.

It is a further object to provide a system of circuits adapted to start the machine into operation, connect the same to the telephone, and disconnect after the message has been completed, all in response to a simple call on the telephone.

It is a further object to provide a machine which inherently lends itself to provision for being preset manually whereby the sound records thereof bearing a variety of phrases may be combined for transmission over a telephone in response to any calls arriving during the absence of the proprietor.

It is a further object of the invention to provide announcing means of the character referred to and means for operation thereof by a metering device, which announcing means is reversible so as to move in accordance with movements of the meter whether the quantity or other indication of the meter is increasing or decreasing, in order that the sound records may at all times be ready to announce the existing conditions correctly.

Further objects of the invention will appear from the following description when read in connection with the accompanying drawing showing an illustrative embodiment of the invention and wherein:

Figure 10 is a vertical section on a much reduced scale showing the means controlling the device when used with a liquid level meter.

Figure 11 is a detail side elevation upon an enlarged scale showing the control means of Figure 10, and Figure 12 is a side elevation of the structure of Figure 11.

Figure 1:
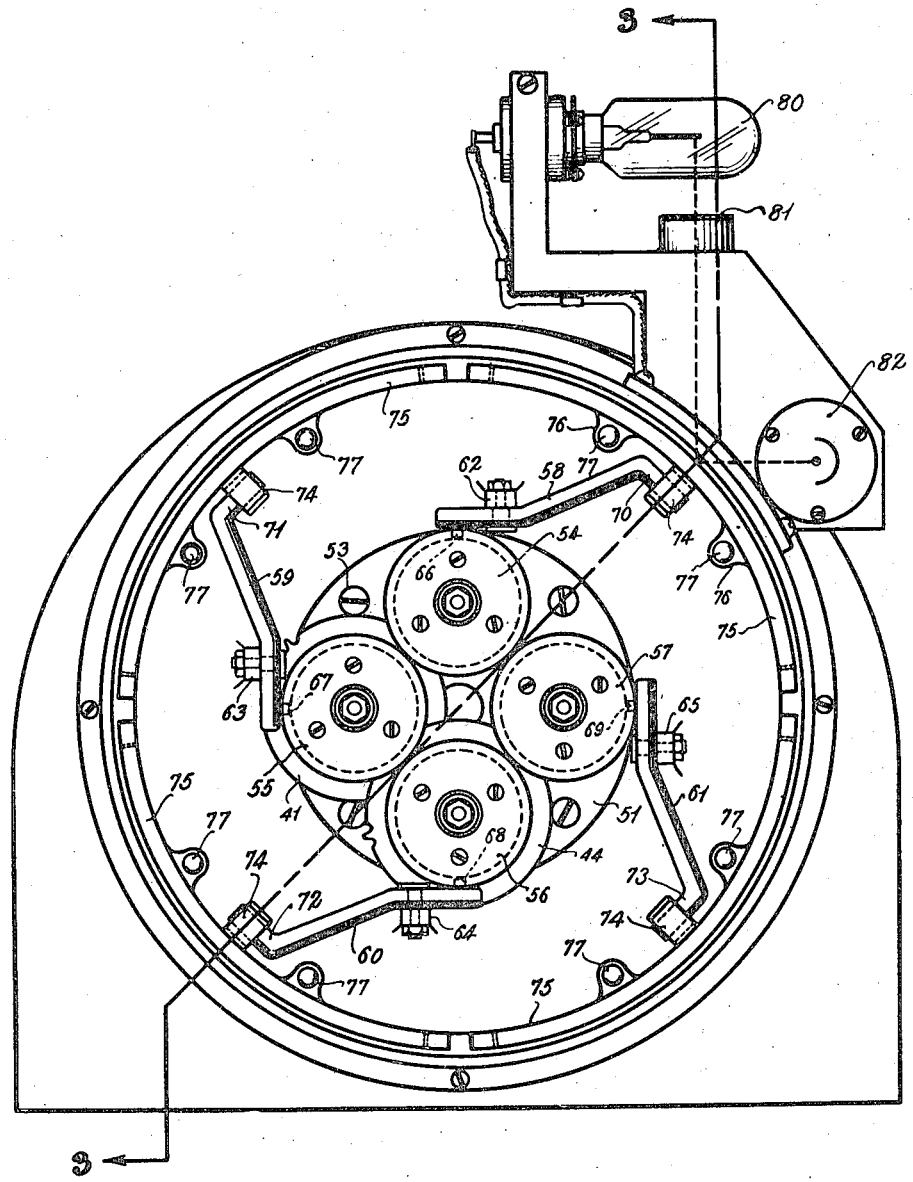
Figure 1 is an elevation of the machine with a cover of the casing removed.

When used with a liquid level meter as shown in Figure 10, there is utilized a float 15 floating upon the liquid 16 in a tank 17 desirably in a well 18 in one side of the tank to avoid minor disturbances. The float 15 is shown as connected with a flexible member 19 passing over a sprocket carried on the shaft of a positioning device 20, and attached to a weight 21 outside of the tank. The member 20 is indicated as a familiar type of Selsyn motor shown as connected by three wires with a second Selsyn motor 22.

Figure 3:
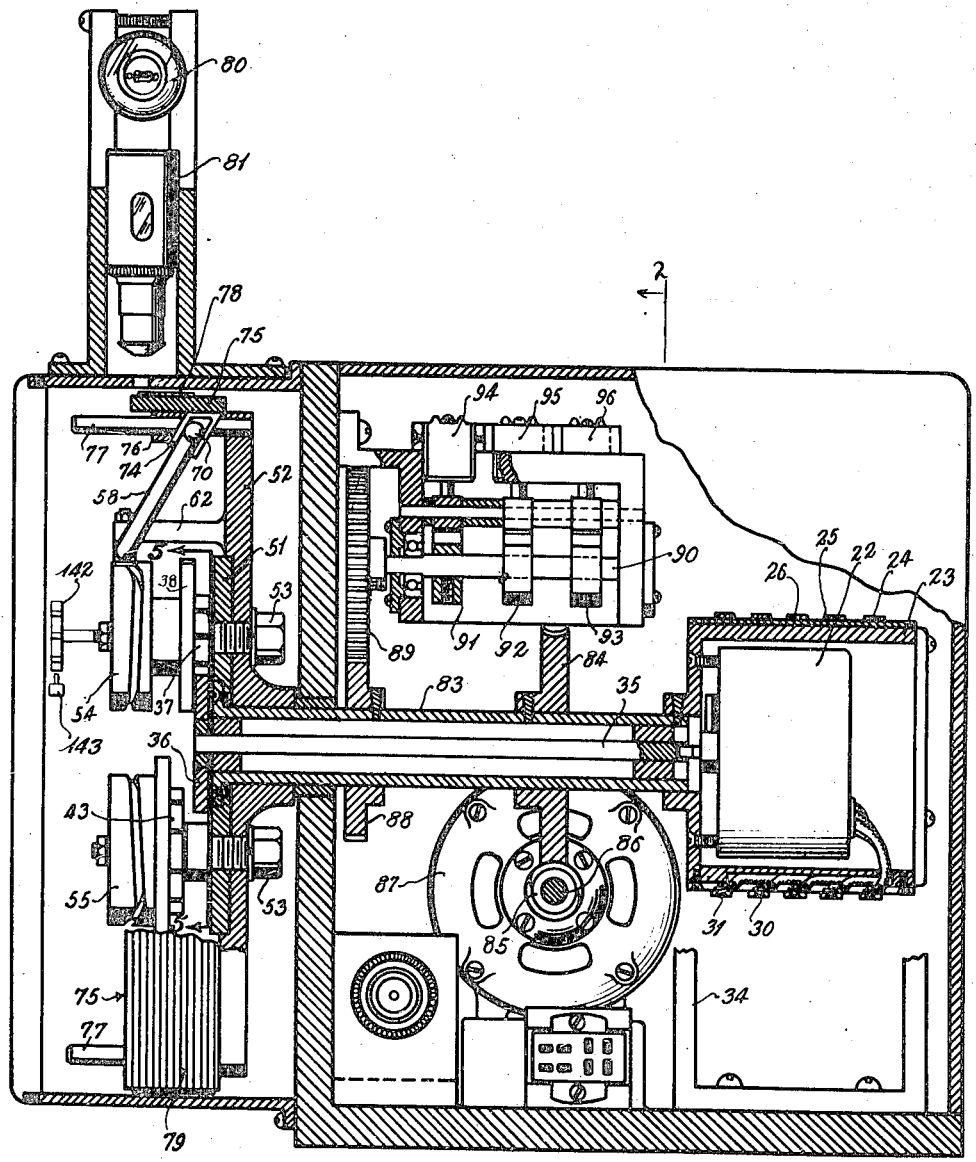
Figure 3 is a section on line 3—3 of Figure 1.
Figure 7:
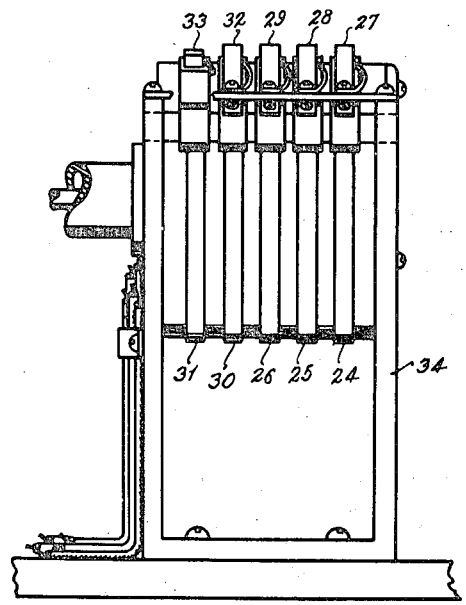
Figure 7 is a detail side elevation of the brush assembly and slip rings used in the control of the device.
Figure 8:
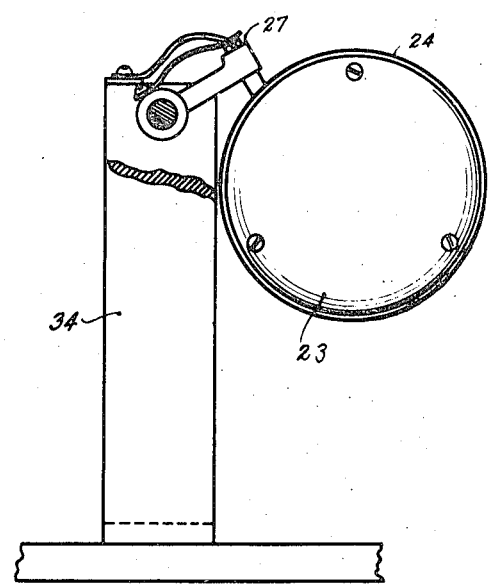
Figure 8 is an end view seen from the right of Figure 7, partly broken away.

As shown in Figure 3, the motor 22 is confined in a casing 23 outwardly provided with slip rings 24, 25 and 26 cooperating with brushes 27, 28, 29 and slip rings 30, 31 cooperating with brushes 32, 33, Figure 7. Three of said slip rings are utilized to connect the Selsyn motors 20 and 22 and the remaining two rings and brushes to connect power to the Selsyn motor. The brushes as shown in Figures 7 and 8 are supported upon a stand 34 and the wires may lead to a junction box not shown.

Figure 5:
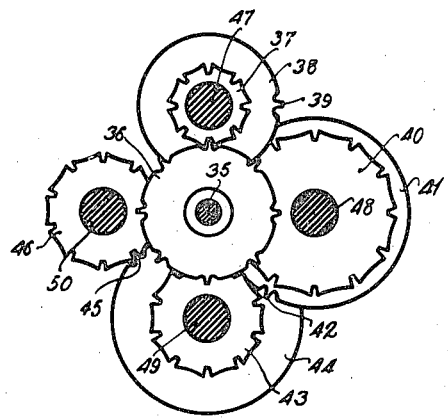
Figure 5 is a detail section on line 5—5 of Figure 3.
Figure 6:
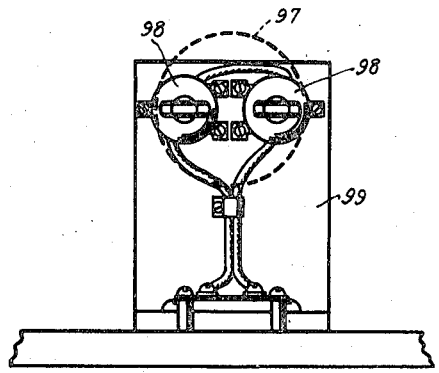
Figure 6 is a detail elevation of magnetic brake magnets used in the device.

For purposes of illustration, the embodiment of the invention shown is arranged to announce the depth of the liquid in multiples of ten feet, units of feet, units of inches, and eighths of inches. To this end the motor 22 is shown as connected by a shaft 35 with a disk 36 provided as shown in Fig. 5 with eight teeth, each tooth representing one-eighth of an inch, which teeth as also shown in said figure, coact with a Geneva gear 37 fast with a disk 38 having a single tooth 39 which disk coacts with a Geneva gear 40 having 12 notches and which is devoted to an announcement of inches. The gear 40 is fast with a disk 41 having a single tooth 42 coacting with a Geneva gear 43 having 10 notches and fast with a disk 44 having a single tooth 45 coacting with a Geneva gear 46 also provided with 10 notches. The respective Geneva gear and disk pairs are mounted upon stub shafts 47, 48, 49 and 50 projecting from a plate 51, Figure 3, which is bolted to a plate 52 as by means of cap screws 53. Each of the Geneva gear carrying shafts 47—50 carries a grooved disk, 54 for fraction of inches control, 55 for inches control, 56 for unit feet control, and 57 for tens of feet control respectively.

As shown in Figure 3, each of these cam disks is provided with a cam groove which runs in a spiral path around the disk to a certain point whereupon it sharply returns to the beginning point of the spiral. To control sound record segments by means of the cam disks there are shown arms 58, 59, 60 and 61, Figure 1, pivoted upon studs 62, 63, 64, 65 projecting from the plate 52 and rigid therewith. Each arm 58—61 carries a dog 66—69 inclusive and the outer ends of the arms are bent at an angle as shown in Figure 1 to the main body of the same as at 70—73 inclusive. The ends of the said arms each project into a guide 74 which guides are rigid each with a segment 75 shown as four in number and which segments are slidably guided by means of eyes 76 sliding on rods 77 projecting from the plate 52. As shown, two guiding rods and coacting eyes are provided upon each of the said segments.

Figure 4:
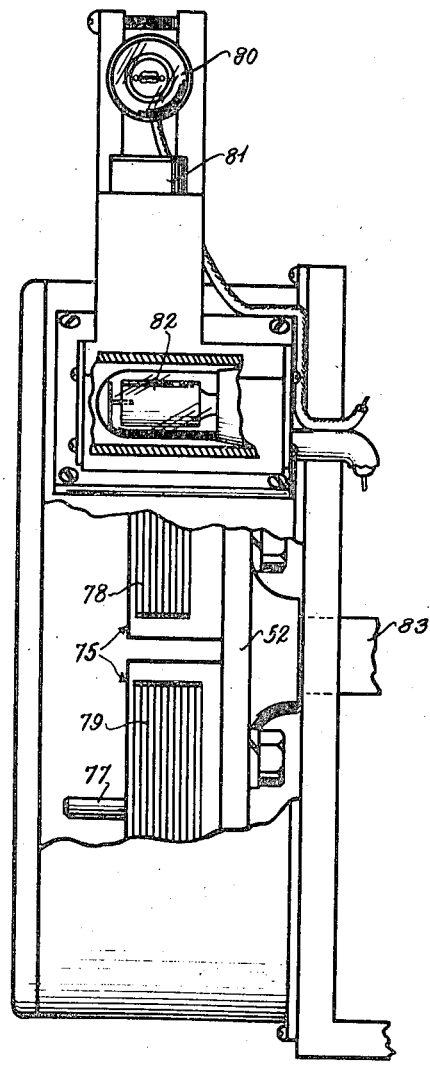
Figure 4 is a detail side elevation of the sound record portion of the machine partly in section.

The segments 75 each bear a plurality of sound records indicated as photographic sound records upon narrow strips of photographic film, there being provided in group 78 of sound records 8 thereof, and in group 79 10 thereof. The group 79 shown in Figure 4 is a multiple of ten group. The group controlled by cam 55 will consist of 12 records and that controlled by cam 56 will be provided with ten sound records to indicate units of feet.

With the arrangement as shown and described and starting with the tank 17 empty, each of the photographic sound record segments will stand with a record to reproduce the word "zero" in alignment with the rays of the lamp 80 extending through a focusing slit 81 and impinging upon the surface of the segments which are polished for reflection of light passing through the sound records. The light when reflected strikes a photoelectric cell 82. As the float 15 rises each eighth of an inch the tape 19 whose perforations each represent one-eighth of an inch, that is 45° of rotation of the shaft of the Selsyn motor 20, will cause 45° of rotation of the shaft 35 thus moving the arm 58 so as to move a different sound record into the path of the light for each 45° of rotation of the disk 36, the motion of the arm 58 and segment carrying the one-eighth inch sound records being correspondingly moved by cam 54. Upon complete revolution of the cam 54, its tooth 39 will give a twelfth of a revolution to gear 40 and cam 55 which after twelve revolutions will step up the foot cam 56 and in turn after ten revolutions thereof, the multiple of feet cam 57.

In this manner the appropriate sound record will be maintained in the path of the light 83 at all times to correctly report the multiple of ten feet, the units of feet, the inches and the friction of inches of depth of liquid in the tank and this action will be caused whether the depth of the liquid in the tank is increasing or decreasing. To cause revolution of the plate 52 for purposes of making an announcement from the film records in the path of the light, the plate 52 is shown as mounted upon a hollow shaft 83 which is revolved by a worm gear 84 through the medium of a worm 85 and the shaft 86 of the motor 87. The shaft 83 also bears a gear 88 in mesh with a gear 89 fast on a cam shaft 90 bearing cams 91, 92, 93 which operate microswitches 94, 95 and 96 for the control of the device in a manner to be described.

By virtue of the fact that the casing 23 for Selsyn motor 22 is mounted rigidly upon the hollow shaft 83 and the motor 22 revolves with the casing, the shifting of the sound records can go forward at any time even though the plate 52 is revolving. To give a clear announcement at least once in each operation of the device, even though some one of the sound records should be in the act of changing, the system is designed to cause the shaft 83 to make two revolutions each time it is set into operation and then be automatically stopped.

Figure 2:
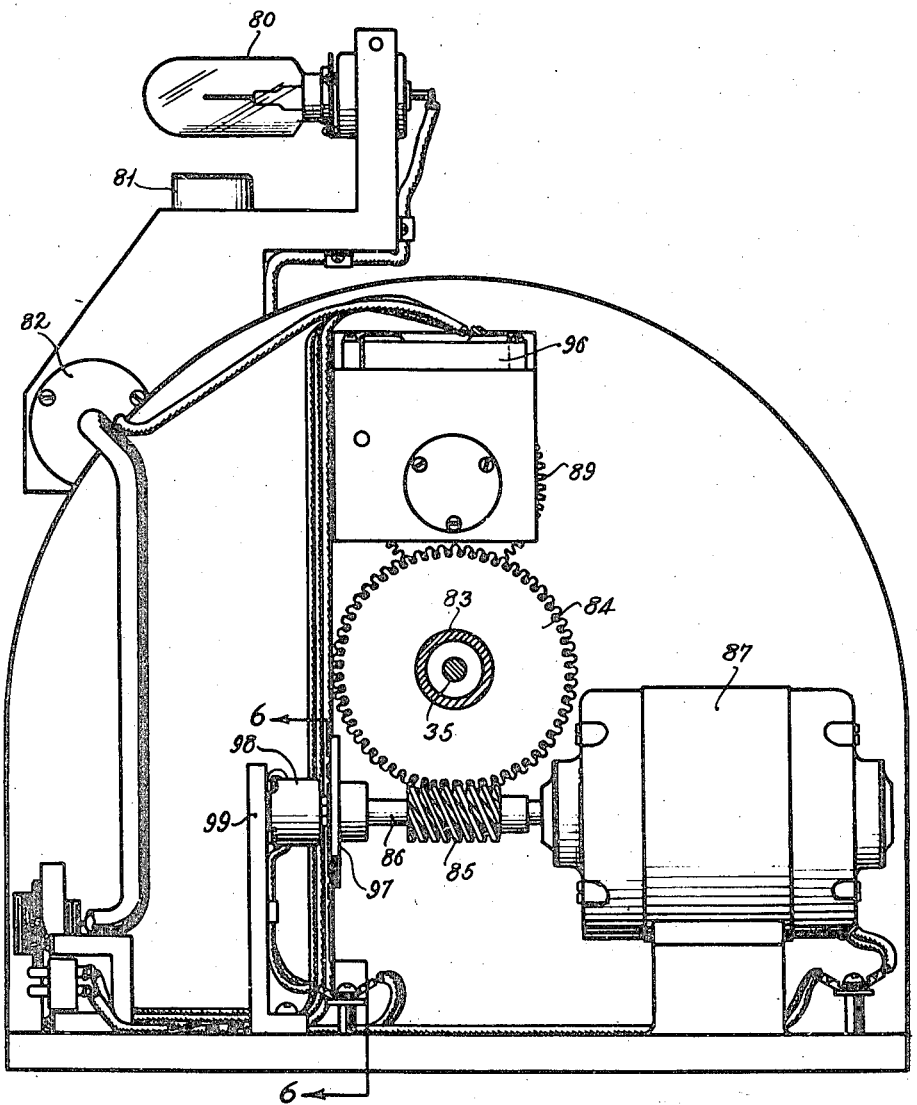
Figure 2 is a transverse section on line 2—2 of Figure 3 omitting a portion of the casing.

In order to provide a prompt stopping of the motor, the shaft 86 is shown as provided with a disk 97 of magnetic material serving as an armature of an electro-magnet 98 fixed on standard 99, Figure 2. When the machine is out of operation the magnet 98 will be energized to hold the shaft of the motor 86 stationary and when current is applied to the motor the magnet 98 is de-energized to release the brake.

Figure 9:
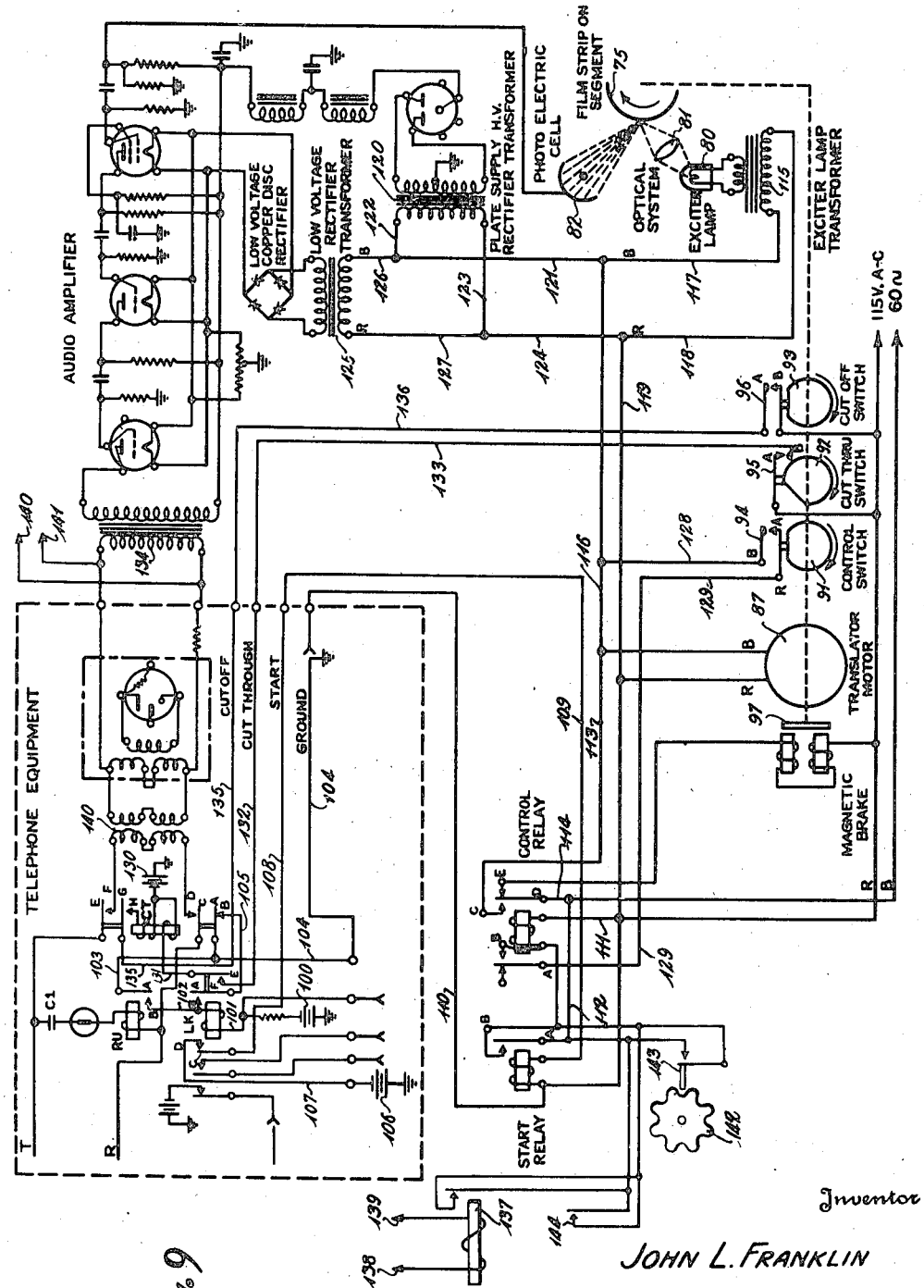
Figure 9 is a diagram of circuits of the control system of the device when utilized with a telephone system.

The system shown in Figure 9 comprises telephone equipment as indicated, which equipment controls the start and control relays and the current to the motor 87 and switch 94. Operation of this motor and switch simultaneously operating switches 92 and 93, control the connection of the telephone circuit to the sound reproducing circuits.

Ringing circuit from the telephone lines TR energizes relay RU to close its contacts A and B. Closing of these contacts completes a circuit from grounded battery 100 over wires 101, 102; contacts A and B of relay RU; wires 103, 104 to ground. This circuit energizes relay LK thus closing its contacts A and B which results in completion of a holding circuit for relay LK over wire 101; contacts of the relay; wire 105 through the normally closed back contacts A, B of relay CT and wire 104 to ground. Operation of relay LK also causes its contacts C and D to close which establishes a circuit from grounded battery 106; wire 107; contacts C, D; wires 108, 109; coil of start relay; wire 110 to ground. Energizing of the start relay winding causes its contacts A and B to close which completes a 60 cycle power current to the coil of the control relay over wire R 111; coil, contacts B and A of the start relay, wire 112 to wire B. The control relay and start relay are a part of the announcing mechanism. Flow of current through the control relay coil causes it to operate and close its contacts C and D thus completing a power circuit to the translator motor 87 over wires 113, 114; also completing a circuit to the primary of the exciter lamp transformer 115 over the wires 116, 117, 118, 119; to the primary of the plate supply high voltage rectifier transformer 120 over wires 114, 113, 116, 121, 122, 123, 124, 119; and to the primary of the low voltage rectifier transformer 125 over wires 114, 113, 116, 121, 126, 127, 124, 119.

This conditions the system for producing announcing modulated current and the motor 87 will now be in operation causing the segments to pass beneath the rays of the exciter lamp 80 thus modulating current through the photo-electric cell and to the input of the audio amplifier. At the same time operation of the control relay and the closing of its contacts D and C results in the opening of its contacts D and E which breaks a normally closed circuit for energizing the coil of the magnetic brake thus removing the magnetic drag on the disk 97 attached to the translator motor shaft permitting the rotation of the translator mechanism. Rotation of the motor 87 through reduction gears 84, 85 revolve the translator segments bearing the sound records assembly at such a speed that the record strips pass under the optical system at the same speed at which the sound was recorded on the records. Other reduction gears 88, 89 rotate the cams 91, 92, 93. Shortly after the translator motor has received its initial starting impulse the control switch cam 91 reaches a point where the contacts of switch 94 are closed. The closing of these control contacts completes a holding circuit through the now closed contacts A and B of the control relay over wire 114; contacts D and C of the control relay wires 113, 128; contacts B and A at 94; wire 129; contacts A and B of the control relay, coil of the relay and wire 111. Further rotation of the translator motor brings cut through switch cam 92 into a position which closes its switch 95 thus completing a battery circuit to the lower coil of the relay CT through the now closed contacts E, F of operated relay LK from grounded battery 130, lower coil of CT, wire 131, contacts E, F of operated relay LK, wires 132, 133 contacts of switch 95 to grounded wire R. The completion of this battery circuit causes the relay CT to operate thereby breaking the holding circuit on relay LK due to the opening of the contacts A and B of relay CT. The operation of relay CT causes its contacts C and B to close and connects one side of the telephone circuit TR to the repeating coil 140 and also through its contacts E and F completes the other side of the telephone circuit to the repeating coil. This repeating coil provides inductive coupling to the output 134 of the audio amplifier. The closing of relay CT also completes a holding circuit through its contacts G and H to its upper coil from battery 130, said contacts, wires 135, 136, contacts of switch 96 to grounded wire R.

By the time the cut through switch has operated the translator motor will have reached its desired speed and the exciter lamp 80 will have been heated to operating temperature as will the filaments of the amplifier tubes. The announcement now results from the audio amplifier in a well known manner and since the translator motor operates the segments through two revolutions for a single revolution of the shaft 90 the announcement will be spoken twice.

The shaft 90 of the control switches will now have reached the point which opens each of their contacts. The control switch contacts A and B being open thereby removes the holding circuit upon the control relay which opens its contacts C and D and makes its contacts D and E thereby again applying current to the magnetic brake bring the translator motor to a quick stop. The opening of the contacts A and B of the cut-off switch removes the holding circuit on relay CT allowing it to return to normal and disconnecting the telephone circuits thereby returning the system to normal.

For purpose of illustration only, the sound record groups are shown as arranged on segments of a cylinder and movable axially of the cylinder for selection. It is within the purview of the invention to so arrange the groups that the path of reproduction will be in a spiral about a cylinder; or longitudinally of a cylinder and relatively movable circumferentially thereof for selection; or even in a plane and movable in one direction relative to each other for selection and in another direction for announcement.

It is obvious that with any arrangement of the records movement of the reproducing means or of the arranged records or both are mechanical equivalents.

It is further obvious that magnetic recording or stylus recording are equivalents of the light recording illustrated.

It is further obvious: 1st that the translator motor 87 may be permanently connected to the power lines R and B so as to run continuously; 2nd that the Selsyn motor in the casing 23 may be replaced by a synchronous motor so as to function as a time motor; 3rd that the transformer 134 may be utilized to modulate a broadcasting system of electromagnetic waves.

In the use of the apparatus in the first named manner, the "start relay," the "control relay" and the "control switch" with their circuits may be omitted, in which event a call over the telephone will cause the calling subscriber to receive two announcements (or more or less if the ratio of gears 88, 89 be changed) and will then be cut off. In the event that both the first and second arrangements are adopted and the sound records be in number and character properly supplied, the time in hours, minutes and seconds plus an advertising slogan may be spoken into the telephone. In the event the first and third arrangements are adopted the apparatus may be caused to continuously broadcast temperature, wind velocity and/or wind direction, humidity or the like.

For use of the system by wireless the machine may be set into operation by causing an audio impulse to actuate the relay 137 by means of a receiving circuit connected to terminals 138, 139 and the radio modulating circuit may be attached to terminals 140, 141 in an obvious manner.

The machine may be adapted to start into operation at each change of reading of the meter by the provision of a cam wheel 142 on the shaft of the first Geneva gear having the same number of cam teeth as said Geneva gear so as to actuate the switch 143 to start the motor 87. For manual starting of the apparatus a push button switch 144 is shown.

By the broadcasting use of the apparatus of the invention, the apparatus, battery powered, can be carried by a balloon to secure weather information from the upper atmosphere; or a plurality of weather stations may be established at locations not readily accessible, and without an attendant at such stations may be tuned in at any time on short wave apparatus from a central point or by an airplane pilot in transit. Moreover the reports from such weather stations would be available to the general public by anyone owning a proper receiving set and therefore to corporations operating their own forecasting weather services.

It is also within the purview of the invention to initiate announcement, electrically, as from a distance, and to cause the announcements to be made locally by loud speaker. These and other modifications may be made in the physical embodiment of the invention, within the scope of the appended claims, without departing from the spirit of the invention.

I claim:

1. In an announcing machine, in combination: a revoluble record carrier; a plurality of rigid record supports each conforming to the surface of a cylinder and slidably mounted on said carrier for selective movement parallel with the axis of the carrier; a plurality of sound records mounted on each said support; the ends of each terminating in a plane through the axis of said carrier whereby selective relative movement between said supports may bring the ends of any two records on adjacent supports into registry for production of a continuous announcement by successive reproduction thereof; sound reproducing means operable over a definite path about the cylindrical surface including said record carriers; and means to cause relative movement between said reproducing means and said carrier to successively reproduce sounds from the records selectively brought into said path.

2. The structure of claim 1 wherein each record has recorded thereon some signal to form a part of an announcement of the reading of a metering instrument, in combination with such metering instrument and means to cause selective relative movement between the carriers to at all times present a correct announcement of the condition measured by the instrument.

3. Announcing apparatus comprising, in combination: a reversible metering instrument operable to continuously measure a physical characteristic and correctly follow increments and decrements thereof; announcing means comprising relatively movable sound record carriers each carrier supporting a group of sound records; each record including the record of a signal expressing a portion of a quantitative announcement of said physical characteristic; reversible mechanism to cause such relative movement; means connecting said instrument and announcing means to actuate said reversible mechanism whereby to associate records of said groups to correctly announce the existing condition; and means to reproduce sound from the thus associated records.

4. Announcing apparatus comprising, in combination: a hollow bearing journaled on a support; a carrier disk mounted on said bearing; a plurality of record carrying segments mounted on said disk with their surfaces in a common cylindrical surface; a plurality of sound records mounted on each segment; means mounting said segments for sliding movement parallel with the axis of said bearing; means carried by said disk for selectively causing said sliding movement; means to cause revolution of said disk; an inner shaft journaled in said hollow bearing and connected for actuation of said selective means; means operable irrespective of the condition of rotation of the hollow bearing for actuating said inner shaft; and means to successively reproduce sound from the selected records when said disk is rotated.

5. The combination of claim 4 in which the selective means comprise revoluble cams spiral through closely approaching 360° of rotation with quick return through the remainder of a complete rotation.

6. The combination of claim 4 in which the selective means comprise revoluble cams spiral through closely approaching 360° of rotation with quick return through the remainder of a complete rotation with means actuated directly by said inner shaft to actuate one of said cams and means rigid with each of said cams but one to actuate a succeeding cam.

7. The combination of claim 4 with a metering instrument comprising a shaft rotated in accordance with the reading thereof; and means to cause rotation of said inner shaft in direction and degree of rotation to agree with that of said instrument shaft.

8. The combination of claim 4 wherein the words recorded on the records of the respective groups express denominational quantities, and wherein the respective selective means are provided with "carry one" means to increase or decrease the quantitative expression represented by the records of the next higher denomination.

9. Announcing apparatus comprising, in combination: a revoluble record carrier support; a plurality of record carriers individually mounted on said support for sliding movement relative to each other; a plurality of sound records; a group thereof mounted on each carrier; said sound records of each group comprising ordinal numbers of a system; a metering device operable to measure quantities in said system; means actuated by said device to cause selective sliding movement of the carrier bearing the lowest denominations of said system to place the correct record thereof for reproduction; a carry one device associated with each carrier to cause movement of the carrier of the next higher order to reproducing position; means to cause revolution of said support; and means to cause reproduction of sound from the selected carriers.

10. Announcing apparatus comprising, in combination: a metering instrument; a revoluble record carrier support; a plurality fo record carriers slidably mounted on said support for movement axially thereof; record carrying surfaces of said carriers conforming to the surface of a cylinder; a plurality of stub shafts projecting from said support individual to the respective carriers; cam means revolubly mounted on each stub shaft to cause selective sliding movement of its carrier; a Geneva gear element mounted on a shaft coaxial with said support and formed with a number of teeth equal to the lowest order of the system utilized by said instrument; Geneva gear means on one of said stub shafts coacting with said teeth to actuate the said cam means thereon; carry one Geneva gear means on the respective shafts, the coacting teeth thereof in number appropriate to the said system acting to at all times so actuate the cams as to arrange the carriers with records in registry with each other to correctly speak the reading of said instrument; means to reproduce sound from the registered records; and means to revolve said coaxial shaft in conformity with measuring movements of said instrument.

11. Announcing apparatus comprising, in combination: a metering instrument including means to affect an electric circuit in accordance with its readings; a revoluble record carrier mounted on a hollow shaft; a plurality of record carrying segments of a cylinder mounted on said carrier for axial sliding movement; an inner shaft journaled in said hollow shaft; means actuated by revolution of said inner shaft to cause selective movement of said segments; a casing mounted on said hollow shaft; slip rings and brushes to conduct electric energy to said casing; electric motor means in said casing connected to cause revolution of the inner shaft; electric connections between said electric motor means and said slip rings and between said brushes and said metering instrument; and means to cause rotation of said hollow shaft and consequent reproduction of sound from records selected by revolution of said inner shaft.

JOHN L. FRANKLIN.

REFERENCES CITED

The following references are of record in the file of this patent:

UNITED STATES PATENTS

| Number | Name | Date |
| --- | --- | --- |
| 1,530,363 | Hayden | Mar. 17, 1925 |
| 1,618,242 | Thompson | Feb. 22, 1927 |
| 1,765,554 | Wensley | June 24, 1930 |
| 1,889,597 | FitzGerald | Nov. 29, 1932 |
| 2,005,788 | Keiser | June 25, 1935 |
| 2,067,098 | Rogers | Jan. 5, 1937 |
| 2,202,517 | DeKoevend | May 28, 1940 |
| 2,239,094 | Harvey | Apr. 22, 1941 |
| 2,284,008 | Miller | May 26, 1942 |
| 2,362,918 | Miller | Nov. 14, 1944 |